United States Patent [19]

Shekleton

[11] Patent Number: 5,456,080
[45] Date of Patent: Oct. 10, 1995

[54] VERY HIGH ALTITUDE TURBINE COMBUSTOR

[75] Inventor: Jack R. Shekleton, San Diego, Calif.

[73] Assignee: Sundstrand Corporation, Rockford, Ill.

[21] Appl. No.: 178,588

[22] Filed: Jan. 7, 1994

Related U.S. Application Data

[63] Continuation of Ser. No. 698,994, May 13, 1991, Pat. No. 5,277,021.

[51] Int. Cl.$^6$ ..................................... F23R 3/16
[52] U.S. Cl. .............................. 60/39.36; 60/752
[58] Field of Search .................. 60/39.36, 752, 60/755, 756, 757, 760

[56] References Cited

U.S. PATENT DOCUMENTS

| | | | |
|---|---|---|---|
| 2,398,654 | 4/1946 | Lubbock et al. | 60/755 |
| 2,638,745 | 5/1953 | Nathan | 60/755 |
| 3,088,279 | 5/1963 | Diedrich | 60/39.36 |
| 3,115,011 | 12/1963 | Deinhardt et al. | |
| 3,383,855 | 5/1968 | Freeman | 60/757 |
| 3,851,465 | 12/1974 | Verdouw | |
| 4,034,560 | 7/1977 | Chute et al. | |
| 4,040,251 | 8/1977 | Heitmann et al. | |
| 4,081,957 | 4/1978 | Cox, Jr. | |
| 4,825,640 | 5/1989 | Shekleton | 60/39.36 |
| 5,069,033 | 12/1991 | Shekleton | 60/39.36 |
| 5,083,422 | 1/1992 | Vogt | 60/752 |
| 5,277,021 | 1/1994 | Shekleton | 60/39.36 |

OTHER PUBLICATIONS

Lefebvre, Arthur H. *Gas Turbine Combustion*. New York, N.Y.: McGraw-Hill, 1983. pp. 14–15, 286–289.

*Primary Examiner*—Timothy S. Thorpe
*Attorney, Agent, or Firm*—Wood, Phillips, VanSanten, Hoffman & Ertel

[57] ABSTRACT

A turbine engine (10) includes a turbine wheel (12) coupled to a compressor (14) for driven movement, a nozzle (16) for directing gases of combustion at the turbine wheel (12), and an annular combustor (18) defining an annular combustion space upstream of the turbine wheel (12) in fluid communication with both the compressor (14) and the nozzle (16). The combustor (18) receives fuel from a source and air from the compressor (14) and combusts them in the combustion space to generate the gases of combustion. The combustor (18) is defined by an annular outer wall (20), an annular inner wall (22), and a radial wall (24) extending therebetween opposite the nozzle (16). The turbine engine (10) also includes at least one air blast fuel injector (26) disposed in the annular outer wall (20) of the combustor (18) for injecting atomized fuel generally tangentially of the outer wall (20) outwardly of a flame zone (28) within the combustion space. In order to achieve the objectives of the present invention, and to do so in a manner which does not require sophisticated fuel injector or combustor designs, the turbine engine (10) utilizes air film strips (36, 38, 40) and/or holes (20b, 22b, 24b) for cooling the combustor (18) with an air film on an inwardly facing surface of one or more of the walls (20, 22, 24) defining the combustor (18) while at the same time avoiding the filming of air onto the outer wall (20) radially outwardly of and generally axially coextensive with the flame zone (28).

11 Claims, 4 Drawing Sheets

1

VERY HIGH ALTITUDE TURBINE COMBUSTOR

This is a Continuation of U.S. application Ser. No. 07/698,994, filed May 13, 1991, now U.S. Pat. No. 5,277, 021.

FIELD OF THE INVENTION

The present invention is generally directed to turbine engines and, more particularly, a simple, inexpensive very high altitude turbine combustor.

BACKGROUND OF THE INVENTION

In many cases, small auxiliary power unit gas turbines are required to start at very high altitudes, e.g., on the order of forty thousand feet or more. It is known that large main propulsion gas turbines cannot start at such high altitudes and, therefore, this requirement for small auxiliary power unit gas turbines is most demanding, particularly since it's generally accepted that combustion is very difficult at best at such altitudes and most particularly so in small scale applications. Furthermore, small auxiliary power unit gas turbines cannot afford the sophisticated fuel injector and combustor designs customary in large main propulsion gas turbines.

Customarily, combustion experts have believed that chemical kinetics is the dominant parameter of concern at very high altitudes. This ordinarily isn't true which means that incorrect correlations have oftentimes been used to provide improper solutions. Typically, for very high altitudes, the principal problem in terms of combustion or ignition resides in poor fuel atomization.

Generally speaking this is true because the fuel droplet size increases with increases in altitude. The high "g" forces which are experienced, particularly in swirl combustors, cause these large fuel droplets to essentially centrifuge onto the combustor walls thereby adding to the problems associated with the normally poor fuel atomization. As a result, it has been difficult at best to achieve adequate combustion under such circumstances.

In view of the foregoing, it has remained to provide an entirely satisfactory solution to such well-known problems in small turbine engines. It has, thus, been a goal to provide a turbine engine, particularly a small auxiliary power unit, which is capable of very high altitude starts but with a simple, inexpensive design. In response to this situation, the present invention is directed to overcoming such problems by providing a very high altitude turbine combustor.

SUMMARY OF THE INVENTION

It is a principal object of the present invention to provide a new and improved turbine engine. It is a further object of the present invention to provide a turbine engine having an enhanced starting capability but with a simple, inexpensive design. It is another object of the present invention to provide a very high altitude turbine combustor.

Accordingly, the present invention is directed to a turbine engine having a turbine wheel coupled to a compressor for driven movement thereof, a nozzle for directing gases of combustion at the turbine wheel, and an annular combustor defining an annular combustion space disposed upstream of the turbine and in fluid communication with both the compressor and the nozzle. The combustor receives fuel from a source and air from the compressor and combusts fuel and air in the combustion space to generate the gases of combustion, and it is defined by an annular outer wall, an annular inner wall, and a radial wall extending between the inner and outer walls axially opposite the nozzle. The turbine engine includes at least one air blast fuel injector disposed in the annular outer wall of the annular combustor for injecting atomized fuel generally tangentially of the annular outer wall outwardly of a flame zone within the combustion space. With this arrangement, the turbine engine further includes means for cooling the combustor with an air film on an inwardly facing surface of one or more of the walls defining the combustor while at the same time avoiding the filming of air onto the outer wall radially outwardly of and generally axially coextensive with the flame-zone.

In an exemplary embodiment, the air film cooling means includes one or more air film strips on an inwardly facing surface of one or more of the walls defining the combustor. Further, the air film cooling means may suitably include a plurality of holes in one or more of the walls defining the combustor for delivering air from the compressor to produce an air film and, in any event, the air film cooling means is preferably adapted to deliver air from the compressor generally tangentially to produce an air film for cooling the combustor. In addition, a plurality of tangentially oriented tubes is preferably provided in the outer wall of the combustor for delivering air from the compressor for purposes of completing the combustion reaction.

In a most highly preferred embodiment, the flame zone is generally adjacent and extends axially from the radially extending wall in a direction toward the nozzle. It is also highly advantageous for the fuel injecting means to comprise a plurality of circumferentially spaced air blast fuel injectors disposed in the outer wall of the annular combustor and for the air film cooling means to be associated with the outer wall in such a manner as to avoid the filming of air onto the portion of the outer wall radially adjacent and substantially axially coextensive with the flame zone. In addition, the air film cooling means preferably also applies an air film on an inwardly facing surface of each of the inner and radially extending walls.

In addition to the foregoing, the air film cooling means is advantageously adapted to deliver air from the compressor generally tangentially to produce the air film for cooling the combustor. The air is then delivered into the combustor in generally the same direction as the atomized fuel. With this arrangement, the air film cooling means and fuel injectors together produce a tangentially swirling flow within the combustor to centrifuge the atomized fuel onto the outer wall.

As for additional details of the invention, the turbine engine may advantageously include a combustor housing in spaced relation to the walls to form an air flow path extending from the compressor substantially entirely about the annular combustor. It will then be most advantageous for there to be a plurality of holes in the walls opposite each of a plurality of axially extending air film strips on the inwardly facing surfaces of the inner and outer walls of the annular combustor, and there may also be provided a plurality of more or less tangentially oriented tubes in the outer wall of the combustor, somewhat downstream of the air blast fuel injectors, for injecting air in the same tangential direction as the film air, and for the purpose of providing sufficient air so as to complete the combustion reaction. Still additionally, the air blast fuel injectors may each advantageously include a fuel supply tube which extends generally axially into an air blast tube extending through the outer wall of the combustor.

Other objects, advantages and features of the present

DETAILED DESCRIPTION OF THE PREFERRED EMBODIMENTS

Figure 1:
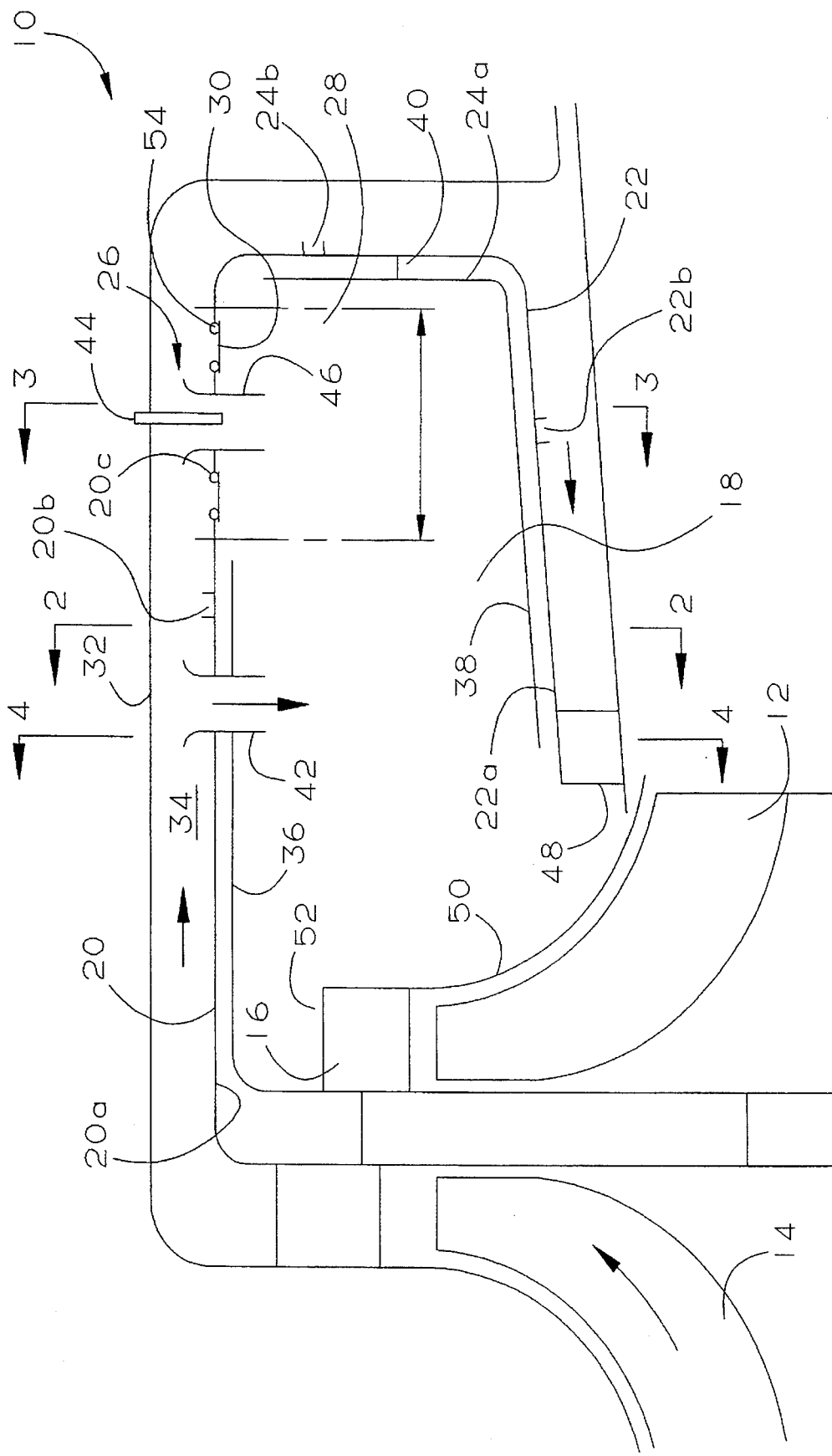
FIG. 1 is a partially schematic cross sectional view illustrating a turbine engine in accordance with the present invention.

In the illustrations given, and with reference first to FIG. 1, the reference numeral 10 designates generally a turbine engine in accordance with the present invention. The turbine engine 10 includes a turbine wheel 12 coupled to a compressor 14 for driven movement thereof, a nozzle 16 for directing gases of combustion at the turbine wheel 12, and an annular combustor 18 defining an annular combustion space disposed upstream of the turbine wheel 12 and in fluid communication with both the compressor 14 and the nozzle 16. The combustor 18 receives fuel from a source and air from the compressor 14 and combusts fuel and air in the combustion space to generate the gases of combustion. The combustor 18 is defined by an annular outer wall 20, an annular inner wall 22, and a radial wall 24 extending between the inner and outer walls opposite the nozzle 16. The turbine engine 10 also includes at least one air blast fuel injector 26 disposed in the annular outer wall 20 of the combustor 18 for injecting atomized fuel generally tangentially of the outer wall 20 outwardly of a flame zone 28 within the combustion space. With this arrangement, the turbine engine 10 further includes means for cooling the combustor 18 with an air film on an inwardly facing surface of one or more of the walls 20, 22 and 24 defining the combustor 18 while at the same time avoiding the filming of air onto the outer wall 20 radially outwardly of and generally axially coextensive with the flame zone 28.

In a preferred embodiment, the turbine engine 10 is of the radial flow type, and the turbine wheel 12 is thus coupled to a rotary compressor 14 for axially driven movement thereof. The nozzle 16 is then generally annular for directing gases of combustion radially at the turbine wheel 12. In addition, the annular combustion space within the combustor 18 is disposed upstream of the turbine wheel 12 and the radial wall 24 is positioned axially opposite the nozzle 16.

Figure 3:
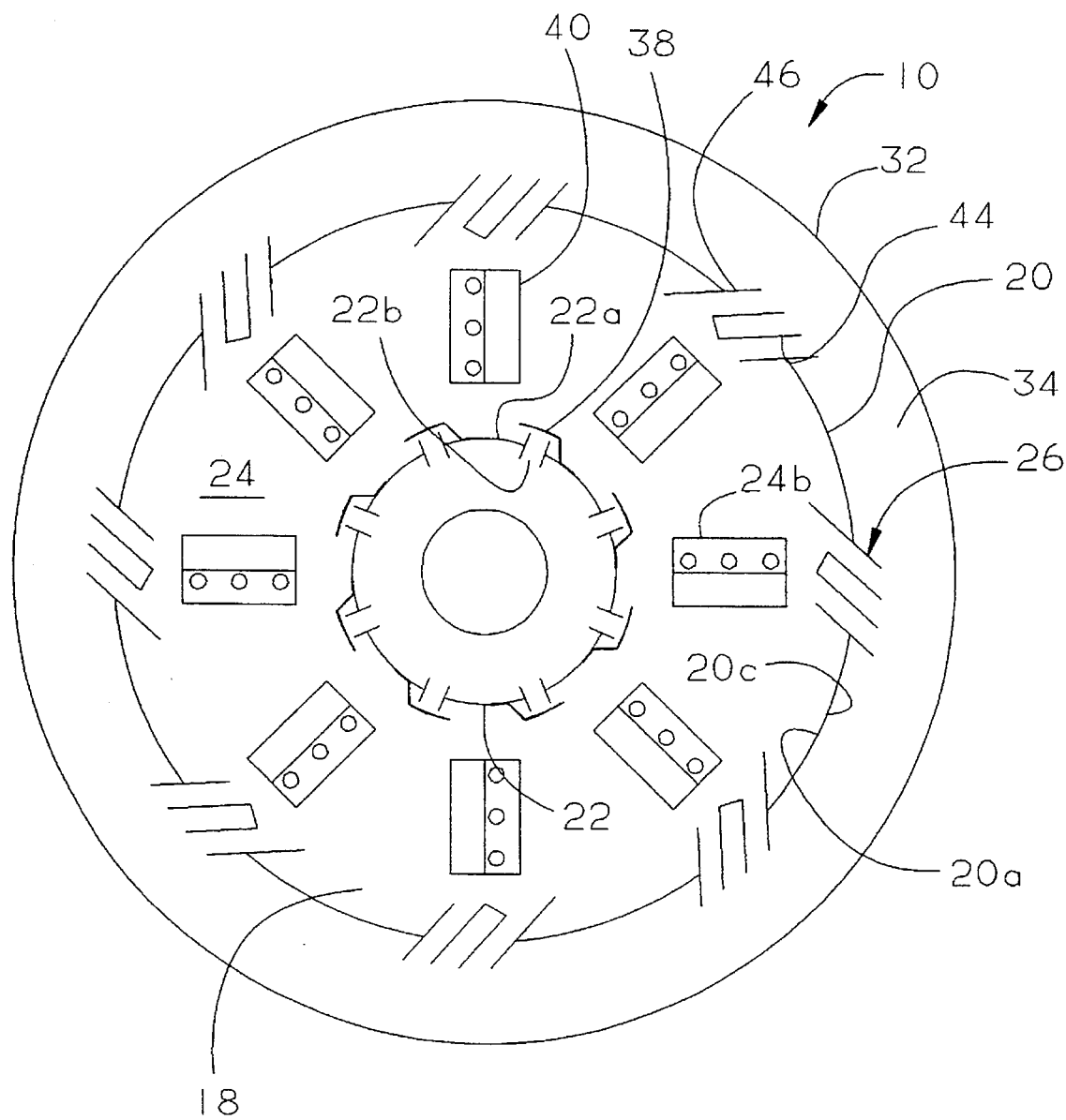
FIG. 3 is a cross sectional view taken on the line 3—3.

As will also be appreciated from FIG. 3, the radial turbine engine 10 preferably includes a plurality of circumferentially spaced air blast fuel injectors 26 which are disposed in the outer wall 20 of the annular combustor 18. Also, it will be appreciated that the flame zone 28 is generally annular in shape and is generally adjacent to and extends axially from the radially extending wall 24 in a direction generally toward the annular nozzle 16.

Figure 2:
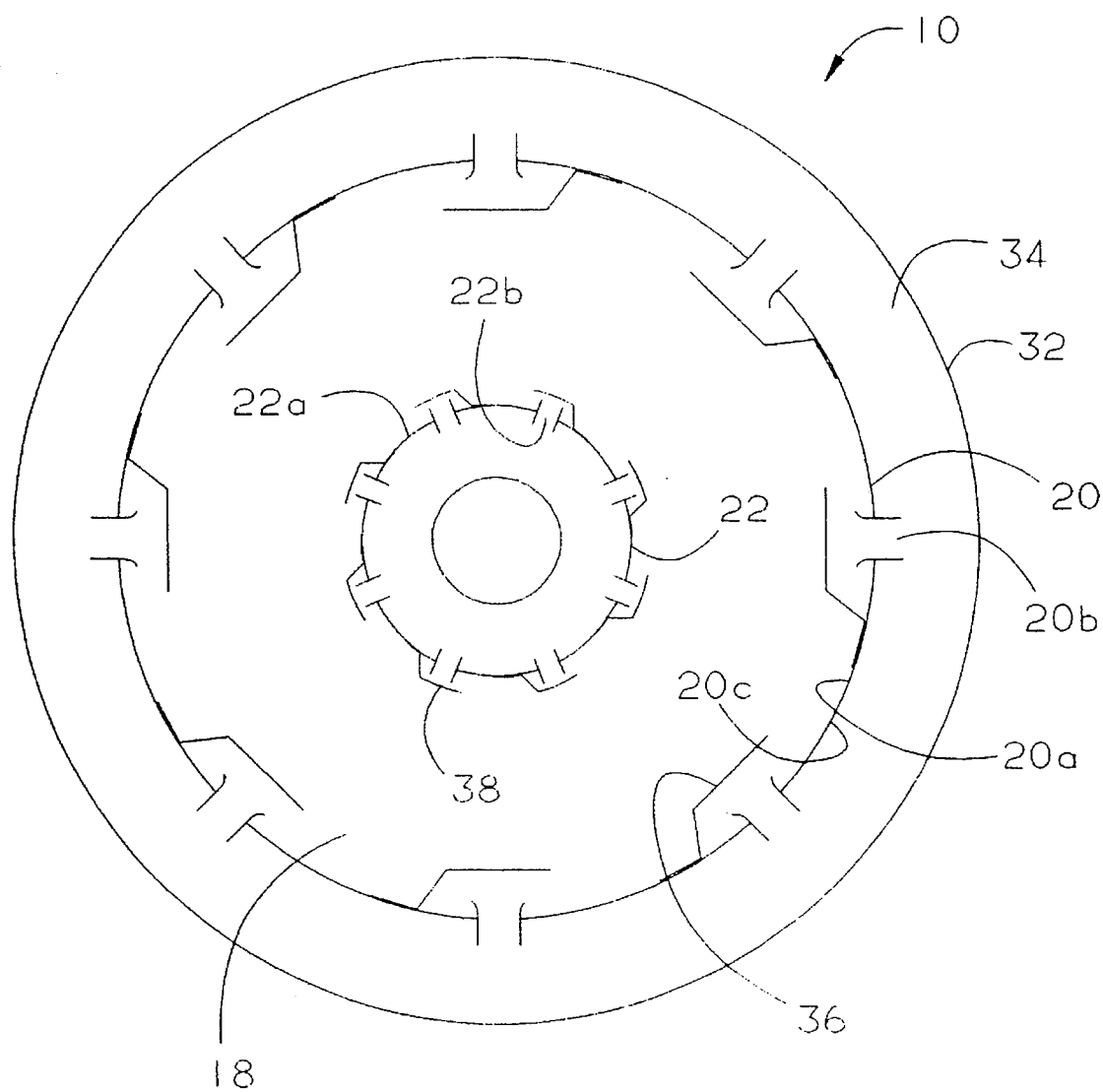
FIG. 2 is a cross sectional view taken on the line 2—2.

Referring to FIGS. 1 and 2, the radial turbine engine 10 includes means for cooling the annular combustor 18 with an air film on an inwardly facing surface 20a of a portion of the outer wall 20 of the annular combustor. It will be seen, especially from FIG. 1, that the air film cooling means associated with the outer wall 20 avoids the filming of air onto the remainder of the outer wall 20 radially adjacent and substantially axially coextensive with the annular flame zone 28. In addition, the turbine engine 10 includes means for cooling the annular combustor 18 with an air film on inwardly facing surfaces 22a and 24a of the inner and radially extending walls 22 and 24, respectively.

As will be appreciated, the air film cooling means is adapted to deliver air form the compressor 14 generally tangentially to produce the air film for cooling the combustor 18. The air is delivered into the combustor in generally the same direction as the atomized fuel which is injected by means of the air blast fuel injectors 26. With this arrangement, the air film cooling means and fuel injectors together produce a tangentially swirling flow within the combustor 18 to centrifuge the atomized fuel onto the outer wall 20 as at 30.

Referring specifically to FIG. 1, the radial turbine engine 10 includes a combustor housing 32 in spaced relation to the walls 20, 22 and 24 to form an air flow path 34 extending from the compressor 14 substantially entirely about the annular combustor 18. The air film cooling means then advantageously includes a plurality of axially extending air film strips 36 and 38 on the inwardly facing surfaces 20a and 22a of the walls 20 and 22, respectively, and a plurality of radially extending air film strips 40 on the inwardly facing surface 24a of the wall 24. As also shown in FIGS. 1 through 3, the air film cooling means includes a plurality of holes 20b, 22b, and 24b in the walls 20, 22 and 24 opposite each of the air film strips 36, 38 and 40 for delivering air from the air flow path 34 to produce the air films.

Figure 4:
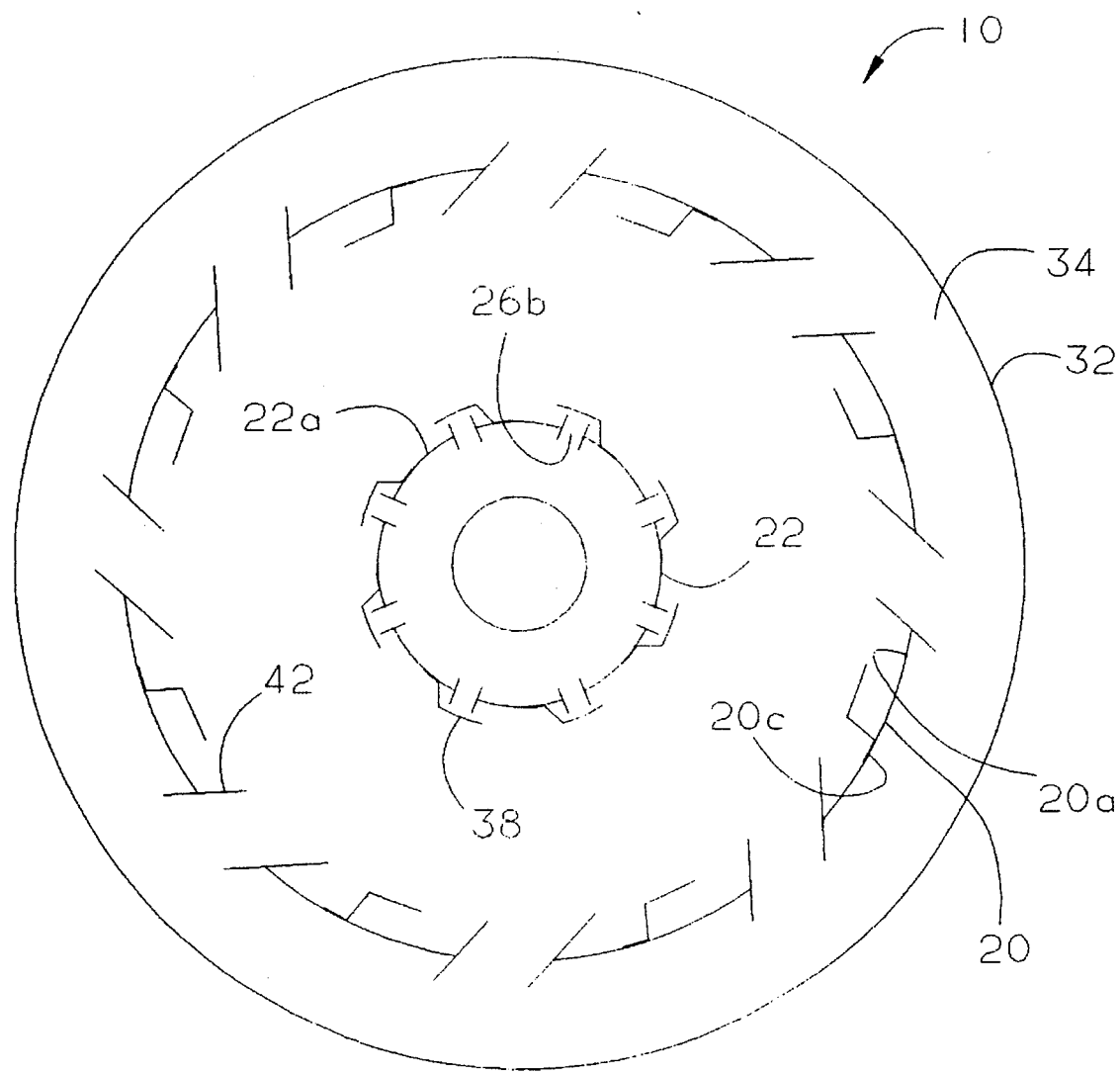
FIG. 4 is a cross sectional view taken on the line 4—4.

In addition, there may also be provided a plurality of tubes 42 in the annular outer wall 20 defining the combustor 18 somewhat downstream of the air blast fuel injectors 26. These tubes, as best shown in FIG. 4, are all arranged more or less tangentially so as to deliver air from the compressor 14 generally tangentially of the combustor 18 in the same tangential direction as the film air, and for the purpose of providing sufficient air so as to complete the combustion reaction. Also, and as best shown in FIG. 3, the air blast fuel injectors 26 each preferably include a fuel supply tube 44 which extends generally axially into an air blast tube 46 extending through the outer wall 20 of the combustor 18 in communication with the air flow path 34.

From FIG. 1, it can be seen that the air flow path 34 extends substantially entirely about the annular combustor to an air discharge point as at 48. Thus, the air discharged as at 48 may be directed onto the turbine shroud 50 for cooling purposes from where it proceeds to the combustor outlet as at 52 for mixing with the gases of combustion prior to entering the nozzle 16. While illustrative of one embodiment of the invention, this detail is not believed essential to utilizing the present invention.

Still referring to FIG. 1, the centrifuged fuel air 30 is seen to be located directly on the inwardly facing surface 20a of the outer wall 20 remote from the region of the air film as formed by the air film strips 36. Ordinarily, the absence of an air film creates a problem in terms of carbon build and/or hot walls, but this is not a problem with the present invention where the centrifuged fuel 30 is radially outwardly of and substantially coextensive with the flame zone 28. In the event of a cooling problem, the turbulence of the air in the air flow path 34 can be enhanced by trip strips 54 secured to the outer surface 20c of the outer wall 20.

While in the foregoing there have been set forth preferred embodiments of the invention, it will be appreciated that the details herein given may be varied by those skilled in the art without departing from the true spirit and scope of the appended claims.

I claim:

1. A radial turbine engine comprising:

a turbine wheel coupled to a rotary compressor for axially driven movement thereof;

an annular nozzle for directing gases of combustion radially at said turbine wheel;

an annular combustor defining an annular combustion space disposed about said turbine wheel and in fluid communication with both said compressor and said nozzle, said combustor receiving fuel from a source and air from said compressor and combusting fuel and air in said combustion space to generate said gases of combustion, said annular combustor being defined by an annular outer wall, an annular inner wall, and a radial wall extending between said inner and outer walls axially opposite said nozzle;

means for injecting atomized fuel generally tangentially of said outer wall radially outwardly of an annular flame zone within said combustion space, said fuel injecting means comprising a plurality of circumferentially spaced air blast fuel injectors disposed in said outer wall of said annular combustor; and means for cooling said combustor with an air film on a portion of a surface of said outer wall of said annular combustor facing inwardly toward said annular combustion space while at the same time avoiding the filming of air onto the remainder of said inwardly facing surface of said outer wall of said annular combustor radially adjacent and generally axially coextensive with said flame zone;

said air film cooling means being adapted to deliver air from said compressor generally tangentially to produce said air film for cooling said combustor, said air being delivered into said combustor in generally the same direction as said atomized fuel by said fuel injectors, said air film cooling means and fuel injectors together producing a tangentially swirling flow within said combustor to centrifuge said atomized fuel onto said outer wall.

2. The radial turbine engine of claim 1 wherein said air film cooling means includes a plurality of axially extending air film strips on said inwardly facing surface of said portion of said outer wall.

3. The radial turbine engine of claim 2 wherein said air film cooling means includes a plurality of holes in said outer wall opposite each of said air film strips for delivering air from said compressor to produce said air film.

4. The radial turbine engine of claim 1 including a plurality of tubes in said annular outer wall defining said combustor for delivering air from said compressor for completing combustion to generate said gases of combustion.

5. The radial turbine engine of claim 1 wherein said air blast fuel injectors each include a fuel supply tube extending generally axially into an air blast tube extending through said outer wall of said combustor.

6. A radial turbine engine, comprising:

a turbine wheel coupled to a rotary compressor for axially driven movement thereof;

an annular nozzle for directing gases of combustion radially at said turbine wheel;

an annular combustor defining an annular combustion space both said compressor and said nozzle, said combustor receiving fuel from a source and air from said compressor and combusting fuel and air in said combustion space to generate said gases of combustion, said annular combustor being defined by an annular outer wall, an annular inner wall, and a radial wall extending between said inner and outer walls axially opposite said nozzle;

means for injecting atomized fuel generally tangentially of said outer wall radially outwardly of an annular flame zone within said combustion space, said flame zone being generally adjacent and extending axially from said radially extending wall in a direction toward said nozzle, said fuel injecting means comprising a plurality of circumferentially spaced air blast fuel injectors disposed in said outer wall of said annular combustor; and means for cooling said combustor with an air film on a portion of a surface of said outer wall of said annular combustor facing inwardly toward said annular combustion space, said air film cooling means associated with said outer wall avoiding the filming of air onto the remainder of said inwardly facing surface of said outer wall radially adjacent and substantially axially coextensive with said flame zone, and means for cooling said combustor with an air film on an inwardly facing surface of each of said inner and radially extending walls of said annular combustor;

said air film cooling means being adapted to deliver air from said compressor generally tangentially to produce said air film for cooling said combustor, said air being delivered into said combustor in generally the same direction as said atomized fuel by said fuel injectors, said air film cooling means and fuel injectors together producing a tangentially swirling flow within said combustor to centrifuge said atomized fuel onto said outer wall.

7. The radial turbine engine of claim 6 including a combustor housing in spaced relation to said walls to form an air flow path extending from said compressor substantially entirely about said annular combustor.

8. The radial turbine engine of claim 7 wherein said air film cooling means includes a plurality of axially extending air film strips on said inwardly facing surfaces of said walls of said annular combustor.

9. The radial turbine engine of claim 8 wherein said air film cooling means includes a plurality of holes in said walls opposite each of said air film strips for delivering air from said air flow path to produce said air films.

10. The radial turbine engine of claim 6 wherein said air blast fuel injectors each include a fuel supply tube extending generally axially into an air blast tube extending through said outer wall of said combustor.

11. The radial turbine engine of claim 6 wherein said air blast fuel injectors each include a fuel supply tube extending generally axially into an air blast tube extending through said outer wall of said combustor.

* * * * *